United States Patent
Wu et al.

(10) Patent No.: US 10,156,748 B2
(45) Date of Patent: Dec. 18, 2018

(54) MATRIX CIRCUIT SUBSTRATE, DISPLAY APPARATUS, AND MANUFACTURING METHOD OF MATRIX CIRCUIT SUBSTRATE

(71) Applicants: GIO OPTOELECTRONICS CORP., Tainan (TW); BARCO N.V., Kortrijk (BE); BARCO CONTROL ROOMS GMBH, Karlsruhe (DE)

(72) Inventors: Yuan-Liang Wu, Tainan (TW); Peter Gerets, Roeselare (BE); Sven Schule, Karlsbad (DE)

(73) Assignees: GIO OPTOELECTRONICS CORP., Tainan (TW); BARCO N.V., Kortrijk (BE); BARCO CONTROL ROOMS GMBH, Karlsruhe (DE)

( * ) Notice: Subject to any disclaimer, the term of this patent is extended or adjusted under 35 U.S.C. 154(b) by 0 days.

(21) Appl. No.: 15/037,226

(22) PCT Filed: Nov. 28, 2014

(86) PCT No.: PCT/EP2014/076030
§ 371 (c)(1),
(2) Date: May 17, 2016

(87) PCT Pub. No.: WO2015/079058
PCT Pub. Date: Jun. 4, 2015

(65) Prior Publication Data
US 2016/0299370 A1 Oct. 13, 2016

(30) Foreign Application Priority Data
Nov. 28, 2013 (TW) .............................. 102143533 A
Dec. 4, 2013 (CN) .......................... 2013 1 0645843

(51) Int. Cl.
*G02F 1/1333* (2006.01)
*G02F 1/1345* (2006.01)
(Continued)

(52) U.S. Cl.
CPC ........ *G02F 1/13338* (2013.01); *G02F 1/1368* (2013.01); *G02F 1/13439* (2013.01);
(Continued)

(58) Field of Classification Search
None
See application file for complete search history.

(56) References Cited

U.S. PATENT DOCUMENTS 4,183,629 A * 1/1980 Nishimura .......... G02F 1/13452
349/138
5,081,063 A * 1/1992 Vonno ................. H01L 25/0657
257/E25.013
(Continued)

FOREIGN PATENT DOCUMENTS

EP 2138892 A1 12/2009
JP 57084518 U1 11/1980
(Continued)

OTHER PUBLICATIONS

International Search Report (ISR) dated Mar. 13, 2015, for PCT/EP2014/076030.
(Continued)

*Primary Examiner* — Sitaramarao S Yechuri
(74) *Attorney, Agent, or Firm* — Bacon & Thomas, PLLC

(57) ABSTRACT

A matrix circuit substrate, having: a substrate body, having a first surface and a second surface which are opposite each other, and at least one sidewall located between the first surface and the second surface, the sidewall having at least one recess; multiple electrodes, disposed in a crisscross arrangement on the first surface; and at least one first (Continued)

conductive material, disposed in the recess to correspond to at least one of the electrodes, and electrically connected to the electrode. Additionally, a display apparatus having such substrate, and to a method for manufacturing such substrate.

17 Claims, 7 Drawing Sheets

(51) Int. Cl.
    *G02F 1/1335*    (2006.01)
    *G02F 1/1343*    (2006.01)
    *G02F 1/1362*    (2006.01)
    *G02F 1/1368*    (2006.01)
    *G06F 3/041*    (2006.01)

(52) U.S. Cl.
    CPC ...... *G02F 1/13452* (2013.01); *G02F 1/13454* (2013.01); *G02F 1/13458* (2013.01); *G02F 1/133308* (2013.01); *G02F 1/133514* (2013.01); *G02F 1/134336* (2013.01); *G02F 1/136286* (2013.01); *G06F 3/0412* (2013.01); *G02F 2201/42* (2013.01)

(56) References Cited

U.S. PATENT DOCUMENTS

| | | | | |
|---|---|---|---|---|
| 5,557,436 | A * | 9/1996 | Blose | G02F 1/13336 349/149 |
| 5,889,568 | A * | 3/1999 | Seraphim | G02F 1/1333 349/1 |
| 6,675,470 | B2 * | 1/2004 | Muramatsu | H05K 3/365 29/830 |
| 2001/0019243 | A1 * | 9/2001 | Hidler | H01L 27/3281 313/505 |
| 2001/0029119 | A1 * | 10/2001 | Chung | H01Q 1/36 439/91 |
| 2003/0146371 | A1 * | 8/2003 | Gudesen | G11C 11/42 250/214.1 |
| 2006/0055008 | A1 * | 3/2006 | Wang | H01L 27/3276 257/666 |
| 2009/0147204 | A1 * | 6/2009 | Kang | G02F 1/13452 349/150 |
| 2009/0160322 | A1 * | 6/2009 | Yoshida | H01L 27/3246 313/504 |
| 2009/0267526 | A1 * | 10/2009 | Sung | H01L 51/529 315/169.3 |
| 2010/0097551 | A1 * | 4/2010 | Yamagishi | G02F 1/1345 349/115 |
| 2011/0317120 | A1 * | 12/2011 | Kajiya | G02F 1/13452 349/149 |
| 2012/0069241 | A1 | 3/2012 | Shiau et al. | |
| 2014/0347590 | A1 | 11/2014 | Fujita et al. | |

FOREIGN PATENT DOCUMENTS

| | | |
|---|---|---|
| JP | S6150118 A | 3/1986 |
| JP | S61167976 A | 7/1986 |
| JP | S61236585 A | 10/1986 |
| JP | S62111240 A | 5/1987 |
| JP | H09500460 A | 1/1997 |
| JP | H10301132 A | 11/1998 |
| JP | H10301134 A | 11/1998 |
| JP | 2001215528 A | 8/2001 |
| TW | 201214361 A1 | 4/2012 |
| TW | 201336087 A1 | 9/2013 |
| WO | 2008/114404 A1 | 9/2008 |

OTHER PUBLICATIONS

Written Opinion dated Mar. 13, 2015, for PCT/EP2014/076030.
International Preliminary Report on Patentability (IPRP) dated Nov. 19, 2015, for PCT/EP2014/076030.
Taiwanese Office Communication & Search Report dated Aug. 21, 2015, for TW 20130143533.
Japanese Office Action in related Japanese Application No. 2016-555925, dated Sep. 25, 2018.

* cited by examiner

MATRIX CIRCUIT SUBSTRATE, DISPLAY APPARATUS, AND MANUFACTURING METHOD OF MATRIX CIRCUIT SUBSTRATE

The present invention relates to the field of display apparatus, and more in particular to matrix circuit substrates for use in such apparatus and their manufacture.

BACKGROUND

As progress is made in science and technology, information devices of all kinds are continuously evolving. This is especially true of the various types of display apparatus or touch display apparatus, which are applied in all sorts of electronic devices, such as mobile phones, flat-screen computers, ultrabooks and e-books. Both the display apparatus and the touch layer thereof are formed by a matrix circuit substrate.

In general, a matrix circuit substrate has electrodes distributed in a crisscross arrangement, and is electrically connected to a drive circuit board via a flexible printed circuit (flexible print circuit, FPC), and also connected to an external control chip. In the case of display apparatus, a connection with an external control chip via a flexible printed circuit allows the emission of light by each pixel of the display panel to be controlled in order to display a picture. Moreover, in the case of touch display apparatus, in addition to the requirement to connect the matrix circuit substrate of the display panel electrically to a drive circuit via a flexible printed circuit, the matrix circuit substrate of the touch layer must similarly be electrically connected to another flexible printed circuit, and similarly connected to an external control chip via this flexible printed circuit, in order to interact with the electrodes of the electrode layer, which react to the panel being touched by a user.

However, a drive circuit board has a definite volume, and the way in which it is configured is the main factor affecting the volume of the display apparatus and display panel. In the prior art, a drive circuit board is disposed at the back of the display panel, and the electrodes are connected electrically to the drive circuit board by a flexible printed circuit, in order to reduce the space occupied by the display apparatus as a whole. However, in the prior art, a space must be left around the periphery of the matrix circuit substrate for outer lead bonding (OLB); in other words, the crisscrossing electrodes on the matrix circuit substrate each extend and are brought together in the outer lead bonding space, in order to be connected electrically to the flexible printed circuit.

However, the space left around the periphery of the matrix circuit substrate for outer lead bonding in turn increases the width of the rim of the display apparatus, with the result that the display apparatus gives the visual impression of not being sufficiently compact and aesthetically pleasing. Moreover, a display panel and a touch panel each require a flexible printed circuit, so a touch display apparatus will have an increased volume. Furthermore, today's users are demanding that display devices or touch display devices are ever lighter and thinner.

Thus, it remains a challenge to provide a matrix circuit substrate and display apparatus which can have a narrower rim region by virtue of novel structural design, so as to form a lighter and thinner structure.

SUMMARY OF THE INVENTION

It is an object of embodiments of the present invention to provide an alternative matrix circuit substrate, display apparatus and/or method for manufacturing a matrix circuit substrate. An advantage of embodiments of the present invention is a narrower rim region by virtue of a novel structural design, so as to form a lighter and thinner structure.

The present invention proposes a matrix circuit substrate, comprising a substrate body, multiple electrodes and at least one first conductive material. The substrate body has a first surface and a second surface which are opposite each other, and at least one sidewall located between the first surface and the second surface, the sidewall having at least one recess. The electrodes are disposed in a crisscross arrangement on the first surface. The first conductive material is disposed in the recess to correspond to at least one of the electrodes, and is electrically connected to the electrode.

It is an advantage of the present invention that, by disposing the first conductive material on (and partly inside) the side wall, space can be saved so as to make the rim region narrower as compared to prior art substrates in which an electrical connection element is disposed on the first surface of the substrate body. By forming a recess in a sidewall of the matrix circuit substrate and filling the recess with a first conductive material, an electrical connection is enabled between an electrical connection element and the first conductive material in a direction parallel to the sidewall.

The term "corresponding" is meant to indicate that the conductive material is physically arranged in such a way as to enable electrical contact between the conductive material and the targeted electrode.

In one embodiment of the present invention, the cross sectional area of the recess on the sidewall is larger than the cross sectional area of the electrode.

It is an advantage of this embodiment that it facilitates making further connections to the conductive material in the recesses, from the side. It is a further advantage of this embodiment that it reduces the risk of disengagement between the conductive material and the recess wall during machining and handling of the substrate.

In one embodiment of the present invention, the matrix circuit substrate further comprises an electrical connection element, which is electrically connected to the first conductive material.

It is an advantage of this embodiment that the specific geometry of the substrate, i.e. the presence of exposed conducting material connecting to the electrodes on the side of the substrate, is used to simplify electrical access to these electrodes.

In one embodiment of the present invention, the matrix circuit substrate further comprises a second conductive material, disposed on the sidewall between the electrical connection element and the first conductive material, to connect the first conductive material electrically to the electrical connection element.

It is an advantage of this embodiment that the overall conductivity of the path between the electrodes and the electrical conductive material is improved. Also, in this manner, geometric discrepancies between the sidewall (in particular, the exposed parts of the first conductive material) and the electrical connection element can easily be bridged.

In one embodiment of the present invention, the matrix circuit substrate further comprises a control circuit electrically connected to the electrical connection element.

It is an advantage of this embodiment that the various functions required for a display or touch screen can be combined in a compact arrangement.

In one embodiment of the present invention, the recess extends to the first surface.

It is an advantage of this embodiment that the first conductive material can be in direct contact with electrodes disposed on the first surface of the substrate.

In one embodiment of the present invention, the recess also extends to the second surface.

It is an advantage of this embodiment that the first conductive material can be in direct contact with further electrodes disposed on the second surface of the substrate.

In one embodiment of the present invention, at least one electrode extends to the juncture of the recess and the first surface, so as to be connected electrically with the first conductive material.

It is an advantage of this embodiment that the first conductive material can be in direct contact with electrodes in the most compact way.

In one embodiment of the present invention, the cross sectional area of the recess on the sidewall is smaller than the maximum cross sectional area of the recess in a direction parallel to the sidewall.

This geometric arrangement ensures that the first conductive material remains positively engaged, i.e. locked inside the recess.

The present invention also proposes a display apparatus, comprising a matrix circuit substrate and a display medium. The matrix circuit substrate comprises a substrate body, multiple electrodes and at least one first conductive material. The substrate body has a first surface and a second surface which are opposite each other, and at least one sidewall located between the first surface and the second surface, the sidewall having at least one first recess. The electrodes are disposed in a crisscross arrangement on the first surface. The first conductive material is disposed in the first recess to correspond to at least one of the electrodes, and is electrically connected to the electrode. The matrix circuit substrate drives the display medium.

The variations of the matrix circuit substrate according to embodiments of the invention, as described above, apply in the same manner to the display apparatus according to the invention which comprises such a matrix circuit substrate.

In one embodiment of the present invention, the display apparatus further comprises a counter substrate disposed opposite the matrix circuit substrate.

It is an advantage of this embodiment that the various functions required for a display or touch screen can be combined in a compact arrangement.

In one embodiment of the present invention, a sidewall of the counter substrate has at least one second recess, and the first conductive material is also disposed in the second recess.

This is one particularly advantageous way to allow interaction between the matrix circuit substrate and the counter substrate.

In one embodiment of the present invention, the counter substrate further includes a third conductive material, a sidewall of the counter substrate also having at least one second recess in which the third conductive material is disposed.

This is another particularly advantageous way to allow interaction between the matrix circuit substrate and the counter substrate.

In one embodiment of the present invention, the first conductive material is electrically connected to a circuit of the counter substrate.

This is yet another particularly advantageous way to allow interaction between the matrix circuit substrate and the counter substrate.

The present invention proposes another display apparatus, comprising a matrix circuit substrate, a counter substrate, at least one first conductive material and a display medium. The matrix circuit substrate has multiple electrodes disposed in a crisscross arrangement. The counter substrate is disposed opposite the matrix circuit substrate, and a sidewall of the counter substrate has at least one recess. The first conductive material is disposed in the recess of the counter substrate to correspond to at least one of the electrodes, and is electrically connected to the electrode. The matrix circuit substrate drives the display medium.

In one embodiment of the present invention, the cross sectional area of the recess on the sidewall is larger than the cross sectional area of the electrode.

The present invention also proposes a method for manufacturing a matrix circuit substrate, comprising the following steps: machining e.g. drilling a mother substrate to form at least one hole, wherein the mother substrate has multiple electrodes in a crisscross configuration; filling the hole with a first conductive material, wherein at least one electrode is electrically connected to the first conductive material; subtractive machining e.g. cutting the mother substrate to form at least one substrate body, each substrate body having a first surface and a second surface opposite each other and at least one sidewall located between the first surface and the second surface; and subtractive machining e.g. grinding the sidewall up to the hole, so that the hole forms a recess in the sidewall and the first conductive material is exposed on the sidewall.

It is an advantage of the method according to the present invention that the interconnections between the electrodes on the surface of the substrate and the controller can be formed in a fast and accurate manner, by drilling transverse holes prior to subtractive machining such as sawing or cutting and/or grinding the substrate to the required size. The matrix circuit substrate thus produced has the technical advantages described above.

In one embodiment of the present invention, the method for manufacturing a matrix circuit substrate further comprises the following step: curing the first conductive material with which the hole is filled.

The curing may be active (e.g., by applying heat) or passive. Curing includes vulcanizing and cross-linking. It is an advantage of this embodiment, that the cured conductive material will be able to withstand the subsequent machining steps (in particular, grinding) that are applied to the substrate.

In one embodiment of the present invention, the method for manufacturing a matrix circuit substrate further comprises the following step: joining an electrical connection element to the sidewall, so that the electrical connection element is electrically connected to the first conductive material.

It is an advantage of this embodiment that the specific geometry of the substrate, i.e. the presence of exposed conducting material connecting to the electrodes on the side of the substrate, is used to simplify electrical access to these electrodes.

In one embodiment of the present invention, the step of subtractive machining such as grinding the sidewall comprises grinding up to the hole to form a recess, the cross sectional area of the recess on the sidewall being larger than the cross sectional area of the electrode.

It is an advantage of this embodiment that it facilitates making further connections to the conductive material in the recesses, from the side. It is a further advantage of this embodiment that it reduces the risk of disengagement between the conductive material and the recess wall during machining and handling of the substrate.

BRIEF DESCRIPTION OF THE DRAWINGS

These and other technical effects and advantages of embodiments of the present invention will now be described in more detail with reference to the accompanying figures, in which.

Throughout the figures, like elements will be referred to with like reference numerals.

DETAILED DESCRIPTION OF THE INVENTION

The matrix circuit substrate, display apparatus and method for manufacturing a matrix circuit substrate according to preferred embodiments of the present invention are explained below with reference to the relevant drawings, in which identical elements are explained using identical reference symbols. The drawings of all the embodiments of the present invention are no more than schematic, and do not represent real dimensions and proportions.

Figure 1A:
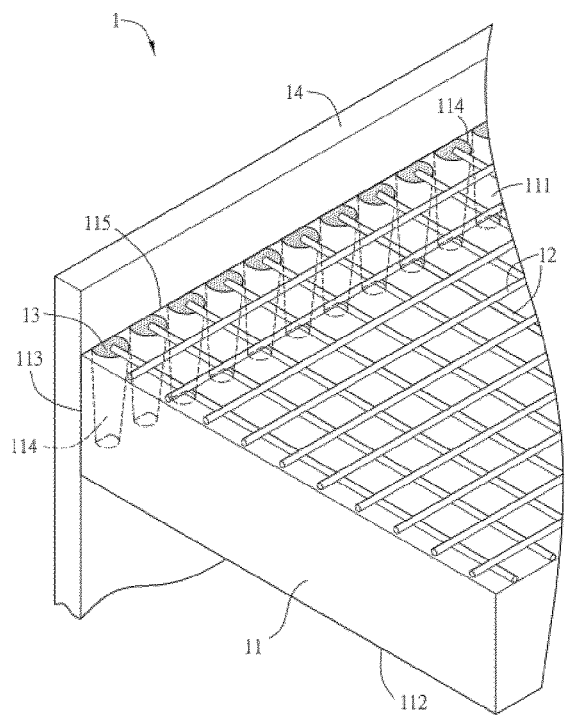
FIG. 1A is a partial schematic diagram of a matrix circuit substrate of a first embodiment of the present invention.

FIG. 1A is a partial schematic diagram of a matrix circuit substrate of a first embodiment of the present invention. As FIG. 1A shows, the matrix circuit substrate 1 comprises a substrate body 11, multiple electrodes 12 and at least one first conductive material 13. The materials of the matrix circuit substrate 1 may include resin, metal, ceramic, glass, plastic or other translucent materials, and the substrate may be used for all sorts of display panels, for example TFT substrates of liquid crystal display (LCD) panels, light-emitting diode (LED) display panels or organic light-emitting diode (OLED) display panels, e-paper (e-books), or touch substrates of touch panels. The substrate body 11 has a first surface 111 and a second surface 112 opposite each other, and at least one sidewall 113. The first surface 111 and the second surface 112 are preferably substantially planar and are major surfaces of the substrate body 11. The required degree of smoothness or flatness of the functional surface will be determined by the nature of the application of the substrate. The sidewall 113 is located along a periphery of the substrate, and extends between the first surface 111 and the second surface 112, and preferably, the sidewall 113 is substantially perpendicular to the first surface 111 and second surface 112. The electrodes 12 are disposed in a crisscross arrangement on the first surface 111, to form a matrix circuit. If the matrix circuit substrate 1 of this embodiment is used in display apparatus (panels) of various types, the electrodes 12 may be data lines or scan lines. If the matrix circuit substrate 1 of this embodiment is used in a touch substrate, the electrodes 12 may be sensing electrodes which form an X-Y matrix (X-Y sensor).

Figure 1B:
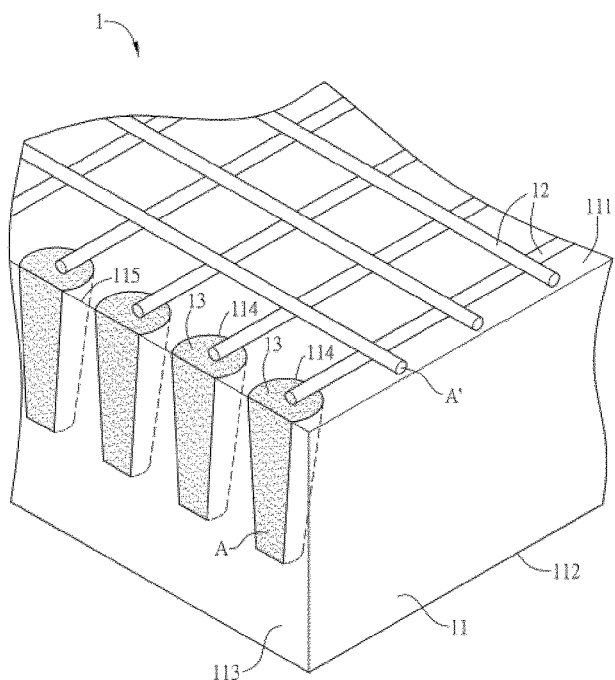
FIG. 1B is a schematic diagram of the substrate body, electrodes and first conductive material shown in FIG. 1A, viewed from another angle.

FIG. 1B is a schematic diagram of the substrate body, electrodes and first conductive material shown in FIG. 1A, viewed from another angle. Hereinafter, FIGS. 1A and 1B will be jointly referred to. In addition, the sidewall 113 in this embodiment is not a smooth surface; preferably, there is at least one recess 114 (a first recess) in the sidewall 113, the recess 114 extending to the first surface 111, i.e. the recess 114 is formed at the juncture 115 of the sidewall 113 and the first surface 111. In this embodiment, multiple recesses 114 arranged in a linear manner are formed in the sidewall 113 of the substrate body 11. In other embodiments, the recesses 114 could be arranged in the sidewall 113 in a non-linear, irregular manner, to give the sidewall 113 a more uneven surface. It must also be pointed out that in order to make the drawings concise, FIGS. 1A and 1B of the present invention show the recesses 114 of the sidewall 113 on just one side. The skilled person will have no difficulty imagining the arrangement of the recess on other sides of the substrate, which may be completely similar and these additional features are within the scope of the present invention.

The first conductive material 13 is disposed in the recess 114 to correspond to at least one of the electrodes 12, which means, in particular, that it is arranged in such a way as to enable electrical contact between the conductive material 13 and the said one of the electrodes 12. The first conductive material 13 is exposed on the first surface 111 and the sidewall 113. Each electrode 12 extends to the juncture of a recess 114 and the first surface 111, i.e. to the distribution area of the recess 114 on the first surface 111, so that the first conductive material 13 is electrically connected to the electrodes 12 separately, to form the matrix circuit substrate 1.

Furthermore, the matrix circuit substrate 1 may further comprise an electrical connection element 14, while the cross sectional area A of the recesses 114 on the sidewall 113 is larger than the cross sectional area A' of the electrodes 12 (as shown in FIG. 1B); hence that part of the first conductive material 13 which is exposed on the surface of the sidewall 113 can be larger than the cross sectional area A' of the electrodes 12, so that the electrical connection element 14 can be electrically connected to the exposed part of the first conductive material 13 directly by being disposed on the sidewall 113. Specifically, the matrix circuit substrate 1 can be made by following the sequence of steps shown in FIG. 2.

Figure 2:
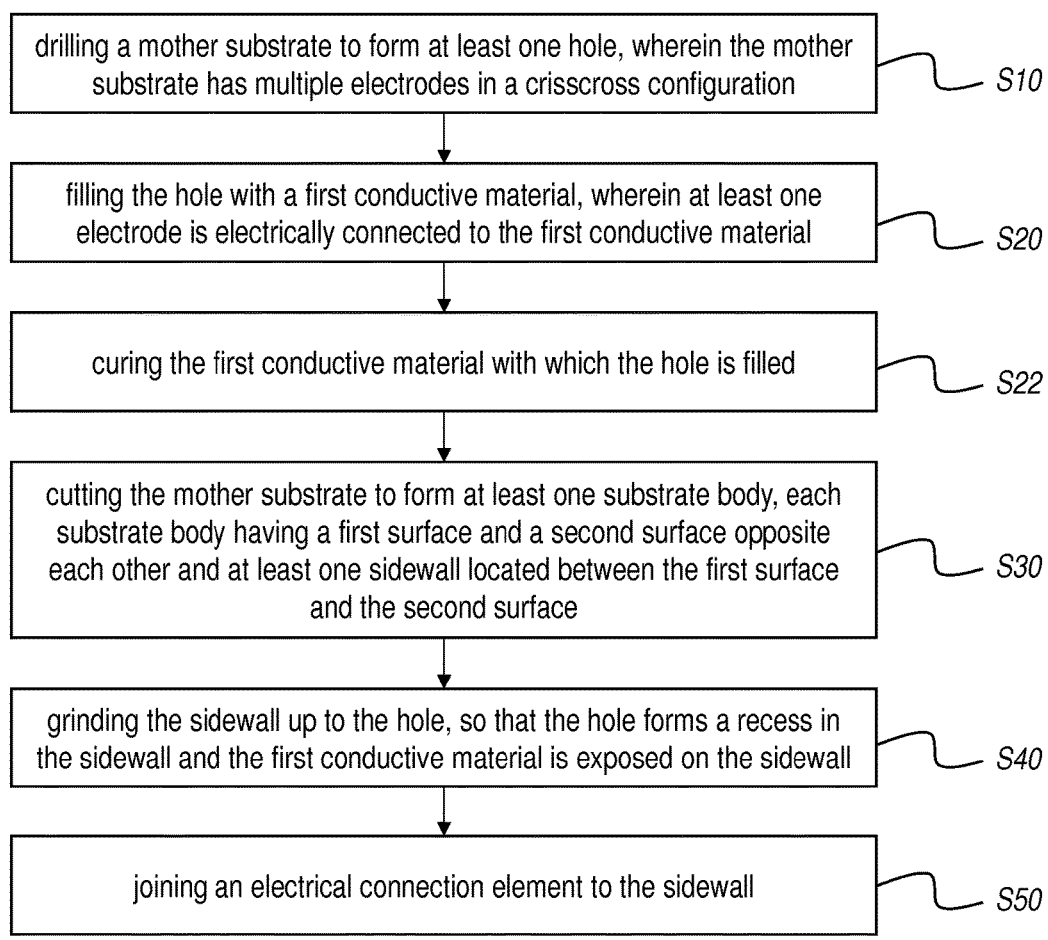
FIG. 2 is a schematic flow chart of the method for manufacturing a matrix circuit substrate of one embodiment of the present invention.

FIG. 2 is a schematic flow chart of the method for manufacturing a matrix circuit substrate of one embodiment of the present invention. As FIG. 2 shows, the method for manufacturing a matrix circuit substrate 1 mainly comprises the following steps:

subtractive machining e.g. drilling a mother substrate to form at least one hole, wherein the mother substrate has multiple electrodes in a crisscross configuration (step S10); filling the hole with a first conductive material, wherein at least one electrode is electrically connected to the first conductive material (step S20); subtractive machining e.g. cutting the mother substrate to form at least one substrate body, each substrate body having a first surface and a second surface opposite each other and at least one sidewall located between the first surface and the second surface (step S30); and subtractive machining e.g. grinding the sidewall up to the hole, so that the hole forms a recess in the sidewall and the first conductive material is exposed on the sidewall (step S40).

Figure 3A:
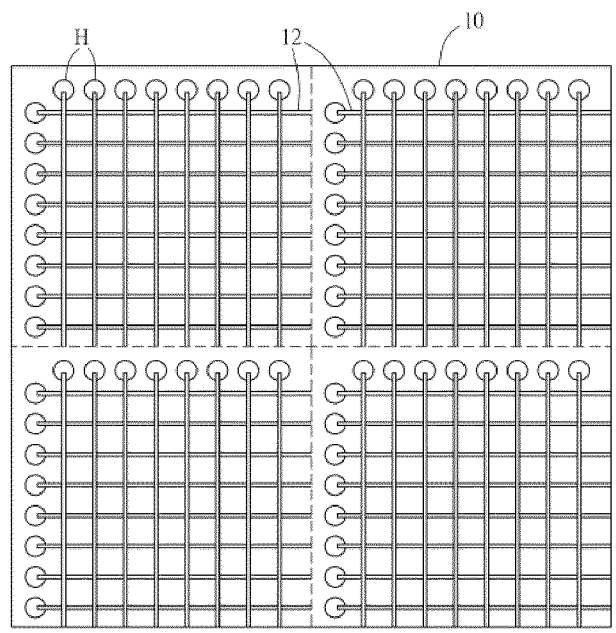
FIG. 3A is a schematic diagram of step S10 shown in FIG. 2.
Figure 3B:
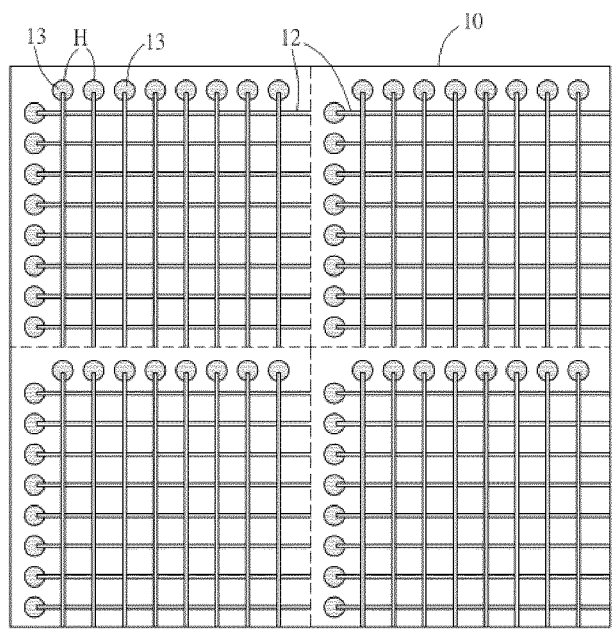
FIG. 3B is a schematic diagram of step S20 shown in FIG. 2.

FIG. 3A is a schematic diagram of step S10 shown in FIG. 2; FIG. 3B is a schematic diagram of step S20 shown in FIG. 2. Hereinafter, FIGS. 2, 3A and 3B shall be jointly referred to. In step S10, a mother substrate 10 is first subtractively machined e.g. drilled to form at least one hole H, which may or may not run through the mother substrate 10; the present invention does not impose any limitation in this respect. The mother substrate 10 has multiple electrodes 12 in a crisscross configuration. Of course, the present invention does not place restrictions on the sequence according to which the electrodes 12 are configured. The electrodes may be configured on the mother substrate 10 before or after drilling, and may be configured after step S20 in which the hole H is filled with the first conductive material 13; the present invention does not impose any limitation in this respect. In this embodiment, the electrodes 12 and the first conductive material 13 may be for example indium-tin oxide (ITO) or indium-zinc oxide (IZO), metal, graphene or other conductive materials, but are not limited to these. The first conductive material 13 and the electrodes 12 may be of the same or different materials, which may be for example a conductive oxide such as ITO or IZO, but are not limited to these.

As FIG. 3B shows, the electrodes 12 are electrically connected to the first conductive material 13, either directly or indirectly. In this embodiment, a direct electrical connection between the electrodes and the first conductive material 13 is taken as an example. If the electrodes 12 are configured on the mother substrate 10 before or after drilling, the electrical connection between the electrodes 12 and the first conductive material 13 is established after the holes are filled with the first conductive material 13 (step S20). In other embodiments, if the electrodes 12 are only configured once the holes H have been filled with the first conductive material 13 in step S20, the electrical connection with the first conductive material is established after configuration of the electrodes 12.

Furthermore, in other embodiments, the electrical connection between the electrodes 12 and the first conductive material 13 is indirect, which means that after configuration of the electrodes 12 is complete and the holes H have been filled with the first conductive material 13, a gap remains between the first conductive material 13 and that end of the electrode 12 which is close to the first conductive material 13, i.e. there is no direct contact between them. At this point, additional conductive material can be configured in the gap, the method used being for example but not limited to evaporation, sputtering, electroplating, printing, inkjetting, coating or dispensing, in order to establish an indirect electrical connection between the electrodes 12 and the first conductive material 13 via the additionally configured conductive material; the present invention does not impose any limitation in this respect.

Preferably, a step S22, in which the first conductive material 13 with which a hole H has been filled is cured, may be further included after step S20 in which the hole is filled with the first conductive material 13. The first conductive material 13 may not just be the abovementioned conductive materials, but may also be mixed with another coating, with the manner of curing being determined by the properties of the coating. For example, if a UV-cured coating is added, the first conductive material 13 may be cured directly by UV irradiation; in this embodiment, the first conductive material 13 is cured directly by drying with heat.

Figure 3C:
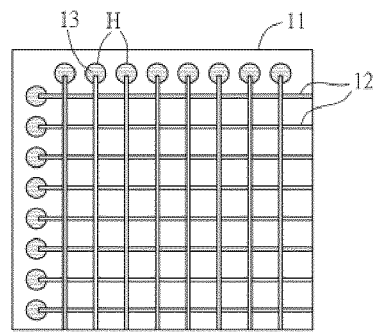
FIG. 3C is a schematic diagram of step S30 shown in FIG. 2.
Figure 3D:
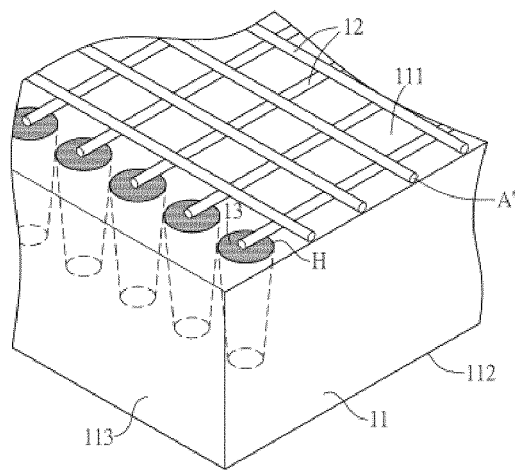
FIG. 3D is a magnified schematic diagram of part of the substrate body shown in FIG. 3C.

FIG. 3C is a schematic diagram of step S30 shown in FIG. 2; hereinafter, FIGS. 2, 3B and 3C will be jointly referred to. In step S30, the mother substrate 10 is cut to form at least one substrate body 11; in this embodiment, the mother substrate 10 is cut (i.e. cut along the dotted lines in FIG. 3B) to form four substrate bodies 11. It must be pointed out that FIG. 3C illustrates just one of these substrate bodies 11. FIG. 3D is a magnified schematic diagram of part of the substrate body shown in FIG. 3C. Referring to FIG. 3D, each substrate body 11, as described above, has a first surface 111 and a second surface 112 which are opposite each other and sidewalls 113 which are formed by cutting the mother substrate 10, the sidewalls 13 being located between the first surface 111 and the second surface 112. In other embodiments, if the mother substrate 10 and the substrate body 11 are similar in size, the periphery of the mother substrate 10 is cut in step S30, so that the sidewall 113 of the substrate body 11 is close to the holes H.

Figure 3E:
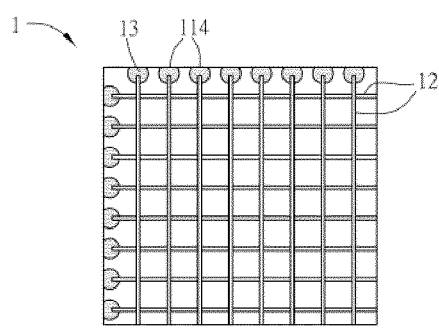
FIG. 3E is a schematic diagram of step S40 shown in FIG. 2.
Figure 3F:
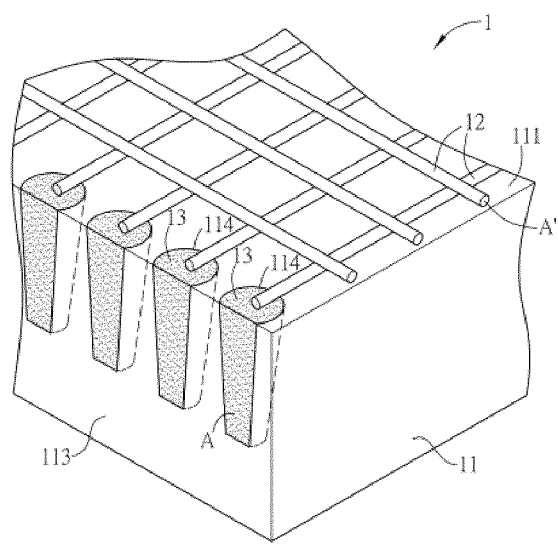
FIG. 3F is a magnified schematic diagram of part of the substrate body shown in FIG. 3E.
Figure 4:
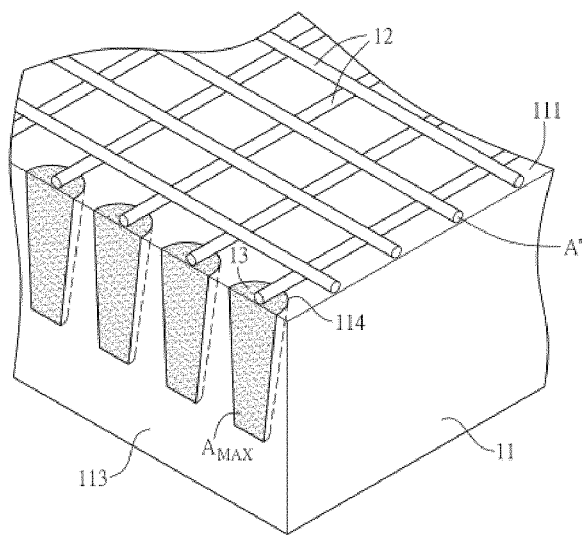
FIG. 4 is a schematic diagram of the maximum cross sectional area of the recesses shown in FIG. 1B in a direction parallel to the sidewall.

FIG. 3E is a schematic diagram of step S40 shown in FIG. 2; FIG. 3F is a magnified schematic diagram of part of the substrate body shown in FIG. 3E. Hereinafter, FIG. 2 and FIGS. 3D to 3F will be jointly referred to. In step S40, the sidewalls 113 (as in FIG. 3D) are ground to the holes H, so that the holes H form recesses 114 in the sidewalls 113 (as in FIG. 3F). In other words, subtractive machining such as grinding is performed until the cross-section of holes H become incomplete circles (as in FIG. 3E), i.e. recesses 114 are formed in the sidewalls 113, and the first conductive material 13 is exposed on the sidewalls 113, at which point the matrix circuit substrate 1 is formed. Preferably, the process of subtractive machining e.g. grinding the holes H until they form recesses 114 can be split into two stages; specifically, the grinding process may consist of first performing coarse grinding up to the vicinity of the holes H or the edges of the holes H, and then grinding finely (polishing) until the cross sectional area A of the recesses 114 on the sidewall 113 is larger than the cross sectional area A' of the electrodes 12. Preferably, grinding may be continued up to ¼ to ½ of the hole H, i.e. not exceed ½ of the hole H, so that the first conductive material 13, which was hardened in step S22, can be prevented from falling out as a result of the grinding process. In other words, the cross sectional area A of the recess 114 on the sidewall 113 (as in FIG. 3F) is smaller than the maximum cross sectional area $A_{MAX}$ of the recess 114 in a direction parallel to the sidewall 113, as shown in FIG. 4, which is a schematic diagram of the maximum cross sectional area of the recesses shown in FIG. 1B in a direction parallel to the sidewall. This figure shall be referred to in conjunction with FIG. 3D. Viewed from the first surface 111, the holes H have a substantially round structure, while the maximum cross sectional area $A_{MAX}$ of the recess 114 in a direction parallel to the sidewall 113 is the recess 114 shown in FIG. 4, formed when the sidewall 113 is ground to the position of the diameter of the hole H, at which point the recess has the maximum cross sectional area $A_{MAX}$. As the cross sectional area A of the recess 114 on the sidewall 113 (as shown in FIG. 1B) is smaller than the maximum cross sectional area $A_{MAX}$ of the recess 114 in a direction parallel to the sidewall 113 in this embodiment, the first conductive material 113 that was hardened in step S22 can be prevented from falling out as a result of the grinding process.

As FIG. 2 shows, after grinding the sidewall 113 up to the hole H to form a recess 114 and exposing the first conductive material 13 on the sidewall 113 in step S40 (as in FIG. 1B), a step S50 may be further included: joining an electrical connection element 14 to the sidewall 113 (as in FIG. 1A), so that the electrical connection element 14 is electrically connected to the first conductive material 13, wherein the electrical connection element 14 can correspond to multiple first connection materials 13 simultaneously. The electrical connection element 14 may be, for example, but is not limited to a data bus, flexible printed circuit (FPC), conductive clip or rigid-flex circuit board, and can be selected according to the apparatus in which the matrix circuit board 1 is used. Thus, compared to prior art in which an electrical connection element is disposed on the first surface of the substrate body, the design of the matrix circuit board 1 of the present invention in which the first conductive material 13 is disposed on the sidewall 113 can further produce the effect of making the rim region narrower.

Figure 5:
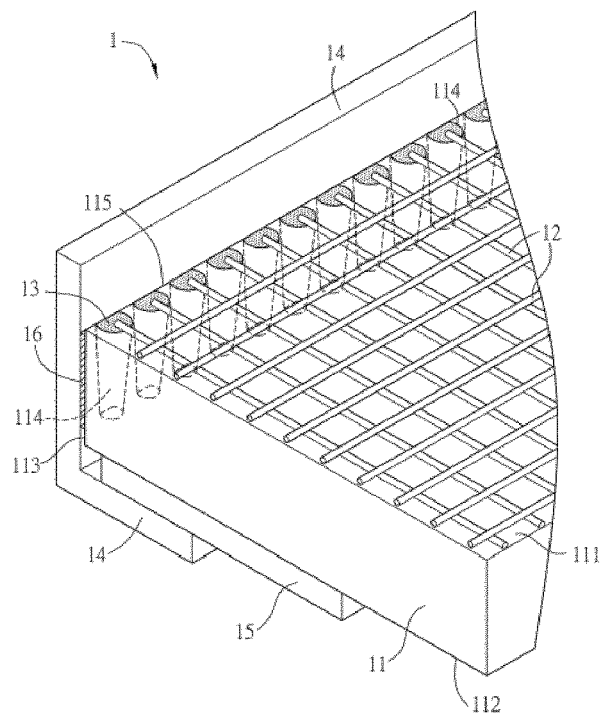
FIG. 5 is a schematic diagram of part of a matrix circuit substrate of a second embodiment of the present invention.

FIG. 5 is a schematic diagram of part of a matrix circuit substrate of a second embodiment of the present invention. In FIG. 5, other components have been added to the matrix circuit substrate 1 of the first embodiment, so the reference symbols used for the latter are retained. As FIG. 5 shows, the matrix circuit substrate 1 may further comprise a control circuit 15; one end of the electrical connection element 14 is electrically connected to the first conductive material 13, while the other end of the electrical connection element 14 is electrically connected to the control circuit 15, which is disposed on the second surface 112 of the substrate body 11, and controls the conduction of each electrode 12 on the matrix circuit substrate 1. The first and second surfaces 111 and 112 are major surfaces of the substrate 1. The control circuit 15 may be for example but is not limited to a printed circuit board (PCB), glass circuit board, or circuit box. By disposing the first conductive material 13 on the sidewall 113 of the matrix circuit substrate 1, not only can the width of the OLB be reduced (there may even be no OLB region), the operation of disposing the electrical connection element 14 on the sidewall 113 can be facilitated, reducing misalignment of the electrical connection element 14. Thus, compared to prior art in which an electrical connection element is disposed on the first surface of the substrate body, the design of the matrix circuit board 1 of this embodiment in which the first conductive material 13 is disposed on the sidewall 113 can further produce the effect of saving space while making the rim region narrower.

Furthermore, as FIG. 5 shows, the matrix circuit substrate 1 of this embodiment may further comprise a second conductive material 16, disposed on the sidewall 113 between the electrical connection element 14 and the first conductive material 13, for the purpose of connecting the first conductive material 13 electrically to the electrical connection element 14. As an example, the second conductive material 16 in this embodiment is anisotropic conductive film (ACF).

Figure 6:
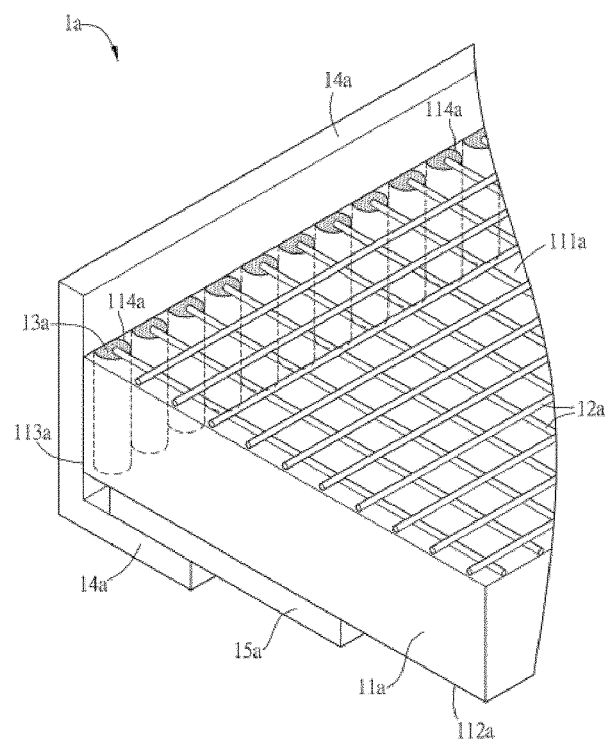
FIG. 6 is a schematic diagram of part of a matrix circuit substrate of a third embodiment of the present invention.

A third embodiment of the present invention will now be described with reference to FIG. 6, which provides a schematic diagram of part of a matrix circuit substrate. The recesses 114a of the matrix circuit substrate 1a of a third embodiment extend not only to the first surface 111a, but also to the second surface 112a, to form a structure in which the recesses 114a run through the substrate body 11a. The surfaces 111a and 112a are major surfaces of the substrate 1a. Hereinafter, FIG. 2 and FIG. 3A will be jointly referred to. In the matrix circuit substrate 1a of this embodiment, holes H which run through the mother substrate 10 can be formed in the step of subtractive machining e.g. drilling to form holes H (i.e. step S10 shown in FIG. 2). Once the matrix circuit substrate 1a has been made, the recesses 114a are a structure extending from the first surface 111a to the second surface 112a. In this embodiment, the area of contact between the first conductive material 13a and the electrical connection element 14a can be increased in order to ensure that the electrodes 12a can be electrically connected to the electrical connection element 14a via the first conductive material 13a. In addition, the conduction of each electrode 12a can similarly be controlled via a control circuit 15a. Since the recesses 114a of the matrix circuit substrate 1a extend to the second surface 112a, the first conductive material 13a with which the recesses 114a are filled similarly extends to the second surface 112a; thus, apart from controlling the conduction of each electrode 12a using a control circuit 15a, in other embodiments, an integrated control circuit can be further disposed directly on the second surface 112a, and electrically connected to the first conductive material 13a of the second surface 112a. In other words, the integrated control circuit is disposed directly on the second surface 112a of the substrate body 11a using Chip-On-Glass (COG) technology, and electrically connected to the first conductive material 13a, so that the conduction of each electrode 12a can be controlled via the integrated control circuit. Furthermore, for information regarding other related elements of the matrix circuit substrate 1a of the third embodiment and the configuration in which they are connected to each other, the matrix circuit substrates 1 of the first and second embodiments may be referred to; details will not be repeated here.

Figure 7:
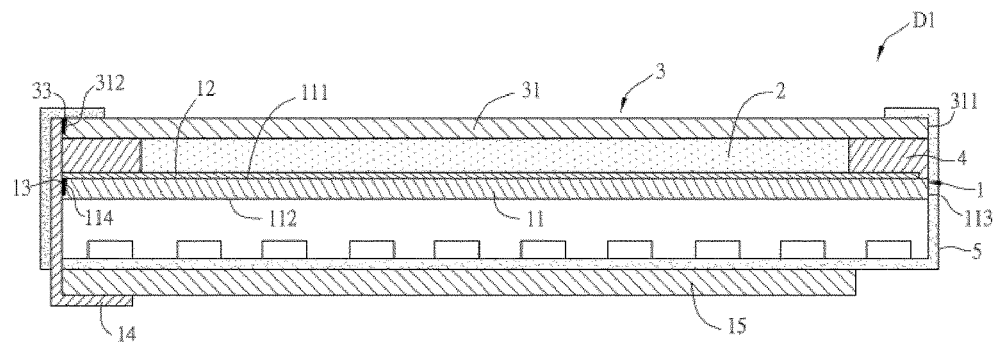
FIG. 7 is a schematic sectional drawing of a display apparatus of a fourth embodiment of the present invention.

A fourth embodiment of the present invention will now be described with reference to FIG. 7, which provides a schematic sectional drawing of a display apparatus. The display apparatus D1 of this embodiment comprises a matrix circuit substrate 1 and a display medium 2. In this embodiment, as an example, the matrix circuit substrate 1 of the second embodiment is used in the display apparatus D1, emission of light by the display medium 2 being driven by the matrix circuit substrate 1. Thus information regarding the characteristics of the related elements of the matrix circuit substrate 1 and the configuration in which they are connected to each other may be found above. Of course, in other embodiments, the matrix circuit substrates 1 and 1a of the first or third embodiment may also be used in the display apparatus D1. The display medium 2 may be for example but is not limited to liquid crystal material, inorganic LEDs, organic LEDs, phosphor, electrophoretic substance, electroluminescent (EL) material or quantum dots. The display medium 2 in this embodiment is liquid crystal material, and the display apparatus D1 is explained using the example of a liquid crystal display (LCD) panel.

In addition to the matrix circuit substrate 1, the display apparatus D1 also comprises a counter substrate 3, arranged opposite the matrix circuit substrate 1. In this embodiment, the counter substrate 3 is a color or monochromatic filter substrate; the example of a color filter (CF) substrate is used here. The matrix circuit substrate 1 may be a thin-film transistor (TFT) substrate, and the electrodes 12 may be data lines or scan lines. It may be that only the data lines or the scan lines have an electrical connection with the first conductive material 13, but it may of course be the case that both the data lines and the scan lines have an electrical connection with the first conductive material 13. In other embodiments, the counter substrate 3 may also be a packaging substrate of an OLED display panel or a top substrate of e-paper (an e-book); this embodiment does not impose any limitation in this respect. The display apparatus D1 further comprises a connection element 4, for example rim cement, for connecting the matrix circuit substrate 1 to the counter substrate 3, so that the matrix circuit substrate 1, counter substrate 3 and connection element 4 form a space in which the display medium 2 can be accommodated. In this embodiment, a backlight module 5 is further included, which may be for example but is not limited to a cold cathode fluorescent lamp (CCFL), hot cathode fluorescent lamp (HCFL), or light emitting diode (LED).

In addition, in this embodiment, a sidewall 311 of a substrate body 31 of the counter substrate 3 may similarly have at least one recess 312 (second recess). Special attention must be drawn to the fact that in order to make the drawing concise, the sidewall 311 and the sidewall 113 shown in FIG. 7 are marked on the side on which there are no recesses 312 or recesses 114, and the counter substrate 3 further includes a third conductive material 33 disposed in the recess 312. Of course, in other embodiments, the recess 312 may also be filled with the first conductive material 13, in other words the recess 312 and the recess 114 may be filled with the same first conductive material 13, or with the third conductive material 33 and the first conductive material 13 (which are different), respectively; the present invention does not impose any limitation in this respect. In addition, the electrical connection element 14 in this embodiment extends to the counter substrate 3, and since the counter substrate 3 may similarly have recesses 312 filled with the third conductive material 33, the counter substrate 3 may be used as a color filter substrate having an electrode layer, or a touch electrode layer may be added to the counter substrate 3, so that the control circuit 15 can control the conduction of each electrode in the electrode layer or additional touch electrode layer of the counter substrate 3 via the electrical connection element 14, so that the display apparatus D1 may be used as a touch display apparatus.

Figure 8:
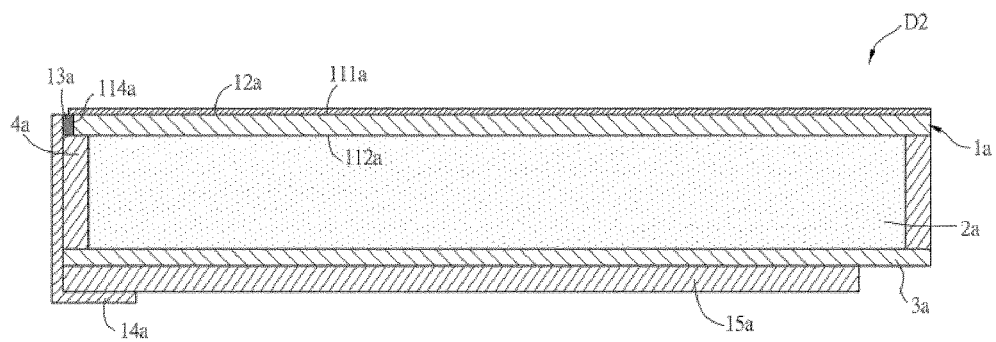
FIG. 8 is a schematic sectional drawing of a display apparatus of a fifth embodiment of the present invention.

A fifth embodiment of the present invention will now be described with reference to FIG. 8, which provides a schematic sectional drawing of a display apparatus. In this embodiment, as an example, the matrix circuit substrate 1a of the third embodiment is used in the display apparatus D2, i.e. emission of light by a display medium 2a is driven by the matrix circuit substrate 1a. Thus information regarding the characteristics of the related elements of the matrix circuit substrate 1a and the configuration in which they are connected to each other may be found above. In this embodiment, as an example, the matrix circuit substrate 1a is a touch sensing substrate, electrodes 12a are X-Y sensing electrodes, and, as an example, a counter substrate 3a is a TFT substrate. The matrix circuit substrate 1a and the counter substrate 3a are disposed opposite each other, with a display medium 2a, which is preferably OLEDs, disposed therebetween. A connection element 4a, which is preferably conductive rim cement, is disposed around the periphery of the display medium 2a, for the purpose of connecting the matrix circuit substrate 1a to the counter substrate 3a. Recesses 114a in the matrix circuit substrate 1a of this embodiment extend not only to the first surface 111a but also to the second surface 112a, so the first conductive material 13a is electrically connected to the circuit of the counter substrate 3a (i.e. the circuit of the TFT substrate itself). The first and second surfaces 111a and 112a are major surfaces of the substrate 1a. Specifically, the electrodes 12a of the matrix circuit substrate 1a may be electrically connected to the counter substrate 3a by means of the first conductive material 13a and the connection element 4a (conductive rim cement). Thus the circuit for liquid crystal control which is located on the counter substrate 3a (TFT substrate) can share the control circuit 15 with the matrix circuit substrate 1a (touch sensing substrate), to reduce material costs.

Figure 9:
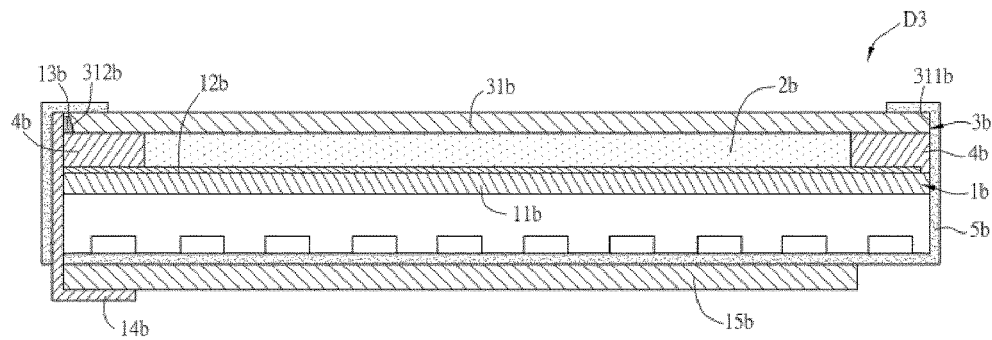
FIG. 9 is a schematic sectional drawing of a display apparatus of a sixth embodiment of the present invention.

A sixth embodiment of the present invention will now be described with reference to FIG. 9, which provides a schematic sectional drawing of a display apparatus. The display apparatus D3 of this embodiment comprises a matrix circuit substrate 1b, a display medium 2b, a counter substrate 3b and at least one first conductive material 13b. The matrix circuit substrate 1b has multiple electrodes 12b disposed in a crisscross arrangement. The counter substrate 3b is disposed opposite the matrix circuit substrate 1b. In this embodiment, the counter substrate 3b, as an example, is a color filter substrate, while the matrix circuit substrate 1b, as an example, is a TFT substrate. A sidewall 311b of the counter substrate 3b has at least one recess 312b; it must also be pointed out that in order to make the drawing concise, the sidewall 311b is marked on the side which has no recesses 312b. The first conductive material 13b corresponds to at least one of the electrodes 12b and is disposed in the recess 312b of the counter substrate 3b, and the first conductive material 13b is electrically connected to the electrode 12b. Specifically, by using conductive rim cement as the principal material of a connection element 4b disposed around the periphery of the display medium 2b, and having the recess 312b extend to the surface on the side close to the connection element 4b, the electrodes 12b on the matrix circuit substrate 1b can be electrically connected to the counter substrate 3b via the connection element 4b (conductive rim cement), and further connected to other electrical elements via the first conductive material 13b disposed in the recess 312b of the counter substrate 3b. In this embodiment, the conduction of the electrodes 12b is controlled so as to drive the display medium 2b by means of an electrical connection between an electrical connection element 14b and a first conductive material 13b, and by means of an electrical connection between a control circuit 15b and the electrical connection element 14b. A feature which this embodiment has in common with the embodiments described above is that the cross sectional area of the recess 312b on the sidewall 311b is larger than the cross sectional area of the electrode 12b; the matrix circuit substrate 1 of the first embodiment may be referred to for details. Information regarding other related elements and the technical features thereof can also be found above, and is not repeated here.

Of course, as is known by those skilled in the art, in other embodiments of the present invention, a substrate such as a touch sensing substrate, color filter substrate or TFT substrate may be added between the matrix circuit substrate 1b and the counter substrate 3b. For example, the counter substrate 3b could be a touch sensing substrate, and the matrix circuit substrate 1b could be a TFT substrate, with a color filter substrate disposed between them.

In summary, in the matrix circuit substrate and display apparatus of embodiments of the present invention, by forming a recess in a sidewall of the matrix circuit substrate and filling the recess with a first conductive material, an electrical connection is enabled between an electrical connection element and the first conductive material in a direction parallel to the sidewall. In other words, the electrical connection element can be disposed directly on the sidewall via the electrical connection with the first conductive material. Thus, compared to prior art in which an electrical connection element is disposed on the first surface of the substrate body, the design of the matrix circuit board of the present invention in which the first conductive material is disposed on the sidewall can further produce the effect of saving space while making the rim region narrower.

Various exemplary aspects of the present invention are summarily defined by the following clauses.

1. A matrix circuit substrate, comprising:
    a substrate body, having a first surface and a second surface which are opposite each other, and at least one sidewall located between the first surface and the second surface, the sidewall having at least one recess;
    multiple electrodes, disposed in a crisscross arrangement on the first surface; and
    at least one first conductive material, disposed in the recess to correspond to at least one of the electrodes, and electrically connected to the electrode.
2. The matrix circuit substrate according to Clause 1, wherein the cross sectional area of the recess on the sidewall is larger than the cross sectional area of the electrode.
3. The matrix circuit substrate according to Clause 1 or 2, further comprising:
    an electrical connection element, which is electrically connected to the first conductive material.
4. The matrix circuit substrate according to Clause 3, further comprising:
    a second conductive material, disposed on the sidewall between the electrical connection element and the first conductive material, to connect the first conductive material electrically to the electrical connection element.
5. The matrix circuit substrate according to Clause 3 or 4, further comprising:
    a control circuit electrically connected to the electrical connection element.
6. The matrix circuit substrate according to any previous clause, wherein the recess extends to the first surface.
7. The matrix circuit substrate according to Clause 6, wherein the recess also extends to the second surface.
8. The matrix circuit substrate according to any previous Clause, wherein at least one of the electrodes extends to the juncture of the recess and the first surface, so as to be connected electrically with the first conductive material.
9. The matrix circuit substrate according to any previous clause, wherein the cross sectional area of the recess on the sidewall is smaller than the maximum cross sectional area of the recess in a direction parallel to the sidewall.
10. A display apparatus, comprising:
    a matrix circuit substrate according to any of the preceding clauses, further comprising:
    a display medium, driven by the matrix circuit substrate.
11. The display apparatus according to clause 10, further comprising:
    a counter substrate disposed opposite the matrix circuit substrate.
12. The display apparatus according to Clause 11, wherein a sidewall of the counter substrate has at least one second recess, and the first conductive material is also disposed in the second recess.
13. The display apparatus according to Clause 11 or 12, wherein the counter substrate further includes a third conductive material, a sidewall of the counter substrate also having at least one second recess in which the third conductive material is disposed.
14. The display apparatus according to any of the clauses 11 to 13, wherein the first conductive material is electrically connected to a circuit of the counter substrate.
15. A display apparatus, comprising:
    a matrix circuit substrate, having multiple electrodes disposed in a crisscross arrangement;
    a counter substrate disposed opposite the matrix circuit substrate, a sidewall of the counter substrate having at least one recess;
    at least one first conductive material, disposed in the recess of the counter substrate to correspond to at least one of the electrodes, and electrically connected to the electrode; and
    a display medium, driven by the matrix circuit substrate.
16. Display apparatus according to Clause 15, wherein the cross sectional area of the recess on the sidewall is larger than the cross sectional area of the electrode.
17. The display apparatus according to Clause 15 or 16, wherein the matrix circuit substrate further comprises an electrical connection element, which is electrically connected to the at least one first conductive material.
18. The Display apparatus according to Clause 17, wherein the matrix circuit substrate further comprises a second conductive material, disposed on the sidewall between the electrical connection element and the first conductive material, to connect the first conductive material electrically to the electrical connection element.
19. The Display apparatus according to Clause 17 or 18, wherein the matrix circuit substrate further comprises a control circuit electrically connected to the electrical connection element.
20. The Display apparatus according to any of the clauses 15 to 19, wherein the first recess extends to the first surface.
21. The display apparatus according to Clause 20, wherein the first recess also extends to the second surface.
22. The display apparatus according to any of the clauses 15 to 21, wherein at least one of the electrodes extends to the juncture of the recess and the first surface, so as to be electrically connected to the first conductive material.
23. Method for manufacturing a matrix circuit substrate, comprising the following steps:
    subtractive machining e.g. drilling a mother substrate to form at least one hole, wherein the mother substrate has multiple electrodes in a crisscross configuration;
    filling the hole with a first conductive material, wherein at least one of the electrodes is electrically connected to the first conductive material;
    subtractive machining e.g. cutting the mother substrate to form at least one substrate body, each substrate body having a first surface and a second surface opposite each other and at least one sidewall located between the first surface and the second surface; and
    subtractive machining e.g. grinding the sidewall up to the hole, so that the hole forms a recess in the sidewall and the first conductive material is exposed on the sidewall.
24. Manufacturing method according to Clause 23, further comprising:
    curing the first conductive material with which the hole is filled.
25. Manufacturing method according to Clause 23, further comprising:
    joining an electrical connection element to the sidewall, so that the electrical connection element is electrically connected to the first conductive material.

26. Manufacturing method according to Clause 23, wherein the step of subtractive machining e.g. grinding the sidewall comprises grinding up to the hole to form a recess, the cross sectional area of the recess on the sidewall being larger than the cross sectional area of the electrode.

The above content is illustrative rather than restrictive. Any equivalent modification or change made to the present invention without departing from the scope thereof should be included in the attached claims.

The invention claimed is:

1. A display apparatus, comprising:
a matrix circuit substrate comprising a substrate body, having a first surface and a second surface which are opposite each other, and at least one sidewall located between the first surface and the second surface, the sidewall having at least one recess; multiple electrodes, disposed in a crisscross arrangement on the first surface; and at least one first conductive material, disposed in the recess to correspond to at least one of the electrodes, and electrically connected to the electrode, wherein said recess does not extend to said second surface;
a display medium, driven by the matrix circuit substrate; and
a counter substrate disposed opposite the matrix circuit substrate,
wherein a sidewall of the counter substrate has at least one second recess, and the first conductive material is also disposed in the second recess.

2. The display apparatus according to claim 1, wherein the first conductive material is electrically connected to a circuit of the counter substrate.

3. The display apparatus according to claim 1, wherein the cross sectional area of the recess on the sidewall is larger than the cross sectional area of the electrode in the plane defined by said sidewall.

4. The display apparatus according to claim 1, further comprising:
an electrical connection element, which is electrically connected to the first conductive material.

5. The display apparatus according to claim 4, further comprising:
a second conductive material, disposed on the sidewall between the electrical connection element and the first conductive material, to connect the first conductive material electrically to the electrical connection element.

6. The display apparatus according to claim 4, further comprising:
a control circuit electrically connected to the electrical connection element.

7. The display apparatus according to claim 1, wherein the recess extends to the first surface.

8. A display apparatus, comprising:
a matrix circuit substrate comprising a substrate body, having a first surface and a second surface which are opposite each other, and at least one sidewall located between the first surface and the second surface, the sidewall having at least one recess; multiple electrodes, disposed in a crisscross arrangement on the first surface; and at least one first conductive material, disposed in the recess to correspond to at least one of the electrodes, and electrically connected to the electrode, wherein said recess does not extend to said second surface;
a display medium, driven by the matrix circuit substrate; and
a counter substrate disposed opposite the matrix circuit substrate,
wherein the counter substrate further includes a third conductive material, a sidewall of the counter substrate also having at least one second recess in which the third conductive material is disposed.

9. The display apparatus according to claim 8, wherein the cross sectional area of the recess on the sidewall is larger than the cross sectional area of the electrode in the plane defined by said sidewall.

10. The display apparatus according to claim 8, further comprising:
an electrical connection element, which is electrically connected to the first conductive material.

11. The display apparatus according to claim 10, further comprising:
a second conductive material, disposed on the sidewall between the electrical connection element and the first conductive material, to connect the first conductive material electrically to the electrical connection element.

12. The display apparatus according to claim 10, further comprising:
a control circuit electrically connected to the electrical connection element.

13. The display apparatus according to claim 8, wherein the recess extends to the first surface.

14. A method for manufacturing a display apparatus, the method comprising the following steps:
manufacturing a matrix circuit substrate by drilling a mother substrate to form at least one hole that does not run all the way through said mother substrate, wherein the mother substrate has multiple electrodes in a crisscross configuration;
filling the hole with a first conductive material, wherein at least one of the electrodes is electrically connected to the first conductive material;
cutting the mother substrate to form at least one substrate body, each substrate body having a first surface and a second surface opposite each other and at least one sidewall located between the first surface and the second surface; and
grinding the sidewall up to the hole, so that the hole forms a recess in the sidewall and the first conductive material is exposed on the sidewall;
forming the matrix circuit substrate with a display medium, driven by the matrix circuit substrate, and a counter substrate disposed opposite the matrix circuit substrate,
wherein a sidewall of the counter substrate has at least one second recess, and the first conductive material is also disposed in the second recess.

15. The method according to claim 14, further comprising:
curing the first conductive material with which the hole is filled.

16. The method according to claim 14, further comprising:
joining an electrical connection element to the sidewall, so that the electrical connection element is electrically connected to the first conductive material.

17. The method according to claim 14, wherein the step of grinding the sidewall comprises grinding up to the hole to form a recess, the cross sectional area of the recess on the sidewall being larger than the cross sectional area of the electrode.

* * * * *